United States Patent Office 3,212,563
Patented Oct. 19, 1965

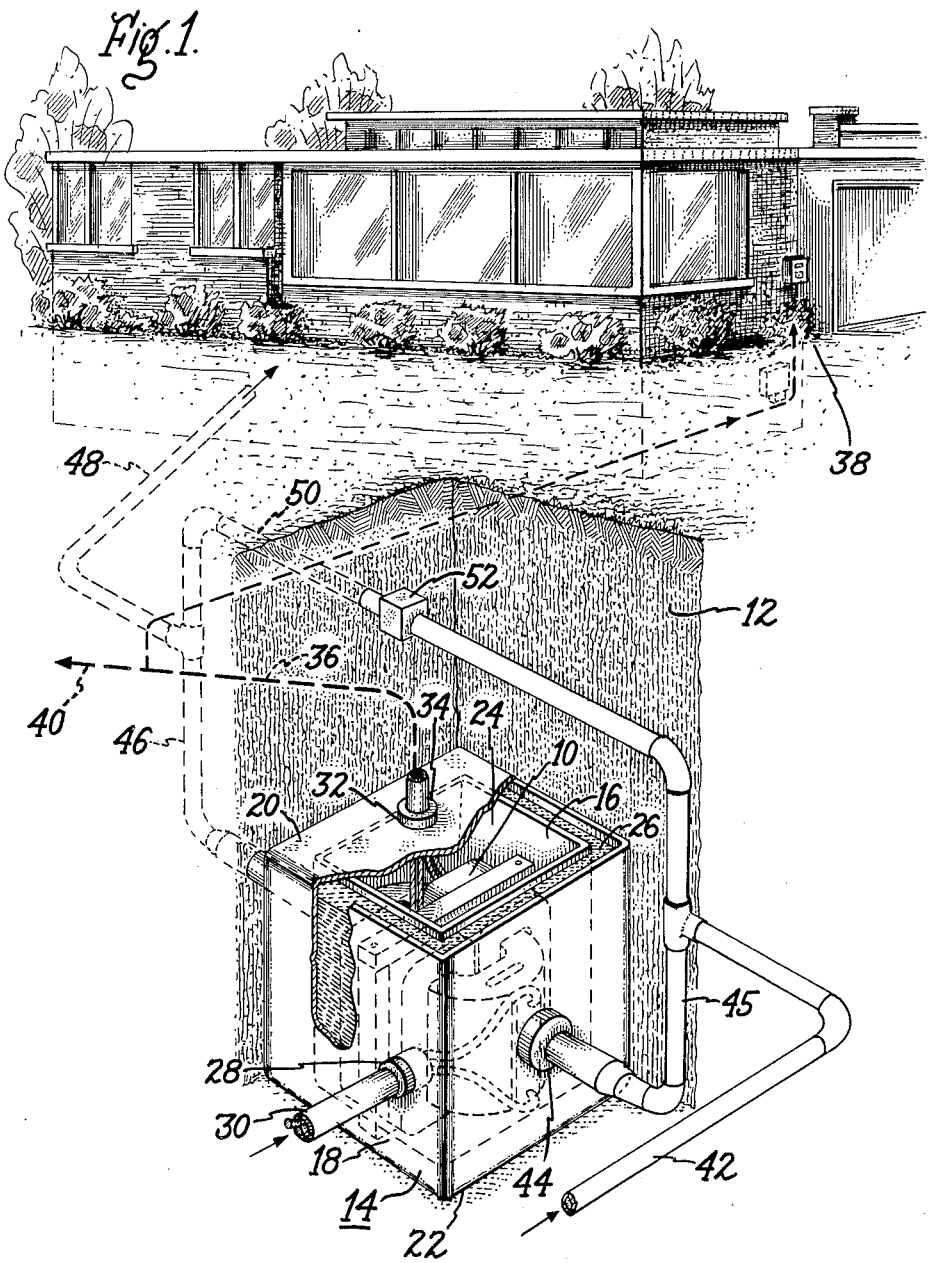

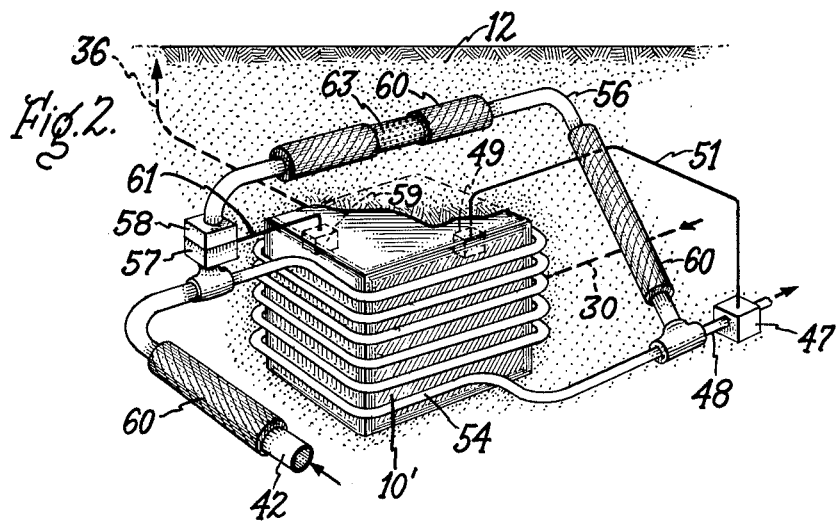
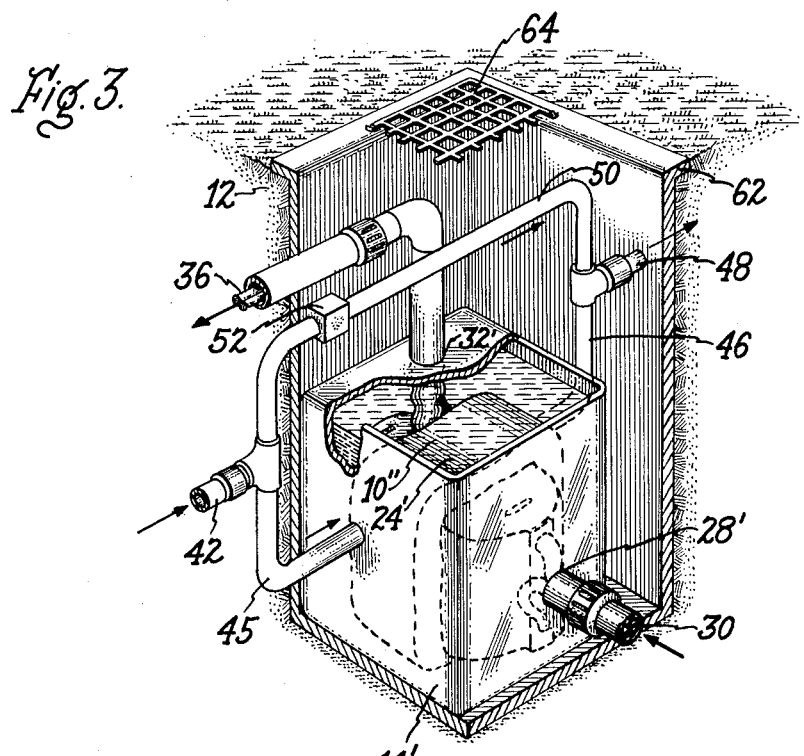

3,212,563
COOLING MEANS FOR BURIED TRANSFORMER
Roger F. Schrader, Pittsfield, Mass., assignor to General
Electric Company, a corporation of New York
Filed Sept. 10, 1962, Ser. No. 222,280
4 Claims. (Cl. 165—45)

This invention relates to transformers and more particularly to a novel cooling means for buried transformers.

In present day distribution systems of electrical energy, it is customary to utilize pole-mounted distribution transformers. The secondary lines from the transformers to the homes serviced by the transformers are usually strung from the transformer to the roof of the house being serviced and then down the side of the house to the customer's electrical service equipment. In many new housing developments much interest has been shown in use of underground distribution systems to eliminate the necessity of overhead electrical wires. In these systems the underground primary lines are connected to pad-mounted distribution transformers and the secondary lines of the transformers are then carried underground to the various homes which are being serviced by the pad-mounted distribution transformer. As will be understood, the installation of the pad-mounted transformers is relatively expensive compared to a pole-mounted distribution transformer, and the expense of the installation has in some instances militated against its use in housing developments, even though the desirability of the elimination of the overhead lines is readily recognized.

In order to eliminate the costly installation of pad-mounted distribution transformers it has been suggested to provide each home with its own transformer. This transformer could be mounted on the side of the home and be directly connected to an underground primary distribution system. This type of installation is described and claimed in Patent No. 3,025,432 issued March 13, 1962 to B. V. Giegerich and assigned to the same assignee as this invention. The type of installation set forth in the Giegerich patent has proved to be very beneficial in that the electrical service package including the transformer can be pre-assembled and mounted on the side of the house and then merely connected to the primary wires of an underground distribution system. This also eliminates the problem of uprating transformers when they are either pole-mounted or pad-mounted inasmuch as the single transformer serving the single house can provide all of the power which is necessary for such house despite the increase of electrical service which may be utilized by the home owner through the years.

Another method which has been suggested for servicing of homes and eliminating of the pole-mounted transformer or the pad-mounted transformer has been the direct burial of a transformer in the vicinity of the residence to be serviced and the running of the secondary lines directly from the buried transformer to the house to be serviced by such transformer. This has found an additional desirability in that it would eliminate all external electrical equipment from the home with the possible exception of an outside installed meter for the use of the utilities in determining the amount of electrical power utilized by the home owner in any period for purposes of billing, as is well understood. However, in direct buried transformers a problem arises in the cooling of such transformers. Where the transformer is directly buried in the ground there is no air circulation for removal of the heat which is developed within the transformer. Further, when the transformer is directly buried within the ground, the ground is generally unable to properly assimilate the heat which is developed by the transformer, especially when such transformer is subjected to overload, and therefore, the transformer tends to become overheated, the heat accumulating about the transformer and eventually causing the destruction of the transformer. In order to make the use of direct buried transformers feasible, it is necessary to provide a means for cooling such transformer which will be efficient in cooling, will be inexpensive to use, and which may be readily utilized with buried transformers in all areas of the country.

It is, therefore, a principal object of this invention to provide a buried transformer with novel cooling means for cooling such transformer.

A further object of this invention is to provide a novel means for water cooling of a buried transformer.

A still further object of this invention is to provide a novel cooling means utilizing available water pipes for cooling of buried transformers which will be available regardless of where the transformer is buried throughout the country.

In carrying out this invention in one form, a transformer is provided which is directly buried in the ground in the vicinity of a residence utilizing the electrical transformer. Means are provided surrounding the transformer and connected to the water supply of the residence utilizing the transformer to provide water cooling of such transformer.

The invention which is desired to be protected will be particularly pointed out and distinctly claimed in the claims appended thereto. However, it is believed that the invention will be better understood and the manner in which its various objects and advantages are obtained, as well as other objects and advantages thereof, from the following detailed description of preferred embodiments thereof, especially when considered in the light of the accompanying drawings, in which:

FIGURE 1 is a perspective view, partly in section, showing a water cooled, buried transformer according to one form of this invention;

FIGURE 2 is a perspective view of a water cooled, buried transformer according to another form of this invention; and FIGURE 3 is a perspective view, partly in section, of a water cooled, buried transformer according to still another form of this invention.

Reference will now be made to the drawings, in which like numerals are used to indicate like parts throughout the various views thereof. In the drawings the invention is shown in a number of forms of preferred embodiments thereof as comprising a transformer which is directly buried in the ground in the vicinity of a residence utilizing the electrical transformer. Means are provided in the form of a jacketing device about the transformer to provide water cooling of the transformer. The jacket device is connected in series with the water pipe servicing the residence, whereby water flows into the jacket device from the water pipe and then out of the jacket device to the residence. If desired, recirculating means may be provided, in the manner shown in the drawing, which are connected in parallel with the jacketing device whereby water may be circulated around the recirculating means and through the jacketing device when the water into the residence is not being used.

Referring now especially to FIG. 1 of the drawing, one form of a preferred embodiment of the invention is shown. In this form, an encapsulated transformer is shown which may be buried in the ground, indicated at 12. The transformer 10 is shown in the form of an encapsulated transformer, such as is described and claimed in the co-pending application Serial No. 114,747, filed June 5, 1961, in the name of E. K. Steele and B. V. Giegerich and assigned to the same assignee as this invention. In the form of invention shown in FIG. 1, the encapsulated transformer 10 is set within a jacket device 14. As shown, the jacket device 14 comprises an inner wall 16 and an outer wall 18 to thereby form an all four sides of the transformer a double-walled enclosure. The jacket 14 is also provided with a top wall 20 and a bottom wall 22, such that the transformer 10 is completely enclosed on all sides. Within the inner wall 16 an area 24 is provided in which the encapsulated transformer 10 is enclosed. Between the inner wall 16 and the outer wall 18 an area 26 is provided surrounding four sides of the transformer and forming a jacket means which may be filled with water for cooling of the transformer within the enclosed area 24. The primary leads 30 to the transformer 10 are brought through an opening 28 which extends through walls 18 and 16 and into the transformer 10. The secondary leads from the transformer may be brought out through an opening 32 and a bushing 34, and is shown as the line 36 which may be carried directly to the residence, indicated at 38. The secondary leads may also be carried on to an adjacent residence, if desired, by the line 40.

In order to provide the desired water cooling of the transformer 10, a water pipe 42 from the water main to the residence 38, is brought into the area 26 formed between the walls 16 and 18 by means of an opening 44 in the wall 18. Water flows out from the area 26 between walls 18 and 16 through a pipe 46 and pipe 48 into the residence 38. As will be understood, when the residence 38 is in use, which will normally be the time during which the electricity is utilized, and thereby when the transformer 10 has an electrical load, the water will generally be utilized within the house thereby causing a flow of water through pipe 42, the area 26 of jacket 14, and pipes 46 and 48 into the house. In this manner, water will flow through the area 26 of jacket 14 to thereby provide water cooling of the transformer 10.

If desired, a recirculating means may be provided in parallel with the jacketed area 26 whereby water may be caused to flow through the area 26 even though no water is being utilized in the residence 38. In order to provide this recirculating means, a pipe 50 is provided which is connected to the pipe 46 and to the pipe 45 in parallel with the water jacket area 26. In the pipe 50 a one-way check valve 52 is provided, such that water may be able to flow through pipe 46, pipe 50, through the one-way valve 52 into the pipe 45 and the jacketed area 26. In this manner, when the temperature of the transformer 10 rises the water will be caused to circulate by convection through the pipe 50 and the valve 52, thereby providing for circulation of water into the jacketed area 26. Thus, even though the water in the residence 38 is not being used, water circulation may be provided to the jacketed area 26 to provide water cooling of the transformer 10 within the area 24. In this manner it may be seen that by means of the jacketed device 14, having area 26 serially connected into the water pipes 42 and 46 servicing the residence 38, the transformer in the area 24 may be provided with water cooling.

Referring now to FIG. 2, a second embodiment of the invention is shown in the form of an encapsulated transformer 10' which is buried in the earth 12 and is provided with water cooling. In this embodiment the water cooling takes the form of a jacketing device which comprises a plurality of coils of tubing 54. As will be understood, it is preferred that tubing 54 be of copper, although other types of non-corrosive metal, or a non-metal such as plastic, can be used. The coils of tubing 54 are serially connected to the inlet water pipe 42, which may be utilized to service a residence which uses the buried transformer 10' in the manner described with reference to FIG. 1. As is shown, the inlet pipe 42 is connected to the upper portion of the jacketed coil 54 and the lower portion of the coil 54 is connected to the line 48 which leads directly to the residence serviced by the transformer 10'. In this maner, as will be understood, as water is utilized within the residence, water will be caused to flow through the pipe 42, the jacketed coil 54, and the pipe 48 into the residence. Of course, as will be understood, the transformer 10' is provided with primary leads 30 providing the primary power to the transformer and secondary leads 36 which provide the electric power from the transformer 10' to the residence served by such transformer.

If desired, the transformer 10' may be provided with a recirculating device which is connected in parallel with the transformer jacket 54 to provide recirculating water flow in order to cool the transformer 10' even though water is not being utilized in the residence. This recirculating device may take the form of the pipe 56 which is connected to the pipe 42 and the pipe 48 in parallel with the jacketed coil 54. A recirculating valve 58 is provided connected into the pipe 56 whereby water may flow from the outlet of coil 54 through pipe 56 and the valve 58 and into the jacketed coil 54. In this manner water may be caused to flow through coil 54 to provide for water cooling of the transformer 10' even when water is not being drawn through the pipe 48.

In the form of invention shown in FIG. 2, additional cooling means are shown as sleeves 60 which are mounted over the pipe 42 and the pipe 56. These sleeves may take the form of wicking sleeves which are placed over the pipes 42 and 56. When the wicking sleeves 60 are utilized small perforations are provided in the pipes 42 and 56 whereby there will be a slight leakage of water into the wicking sleeves and from the wicking sleeves into the soil which surrounds the buried transformer 10' to provide an additional element of cooling, if desired.

Further, additional means may be provided, to obtain the desired cooling of the transformer. One such means may take the form of an electrically operated water valve used in place of the recirculating device 56, 58, or it may be provided in conjunction with the recirculating device 56, 58. In one form, a water valve 47 is provided in the residence water line 48. This valve 47 may be a solenoid operated valve, actuated by a thermal switch, indicated at 49, embedded in the transformer 10'. The thermal switch 49 is designed to close when the transformer 10' reaches a predetermined temperature, thereby energizing the valve 47 over the line 51. When energized, the valve 47 opens to allow water to flow out of pipe 48 into the ground, thus providing circulation of water through the jacket coil 54. Of course, as soon as the transformer 10' has cooled sufficiently, the thermal switch 49 will open, de-energizing the valve 47, which is thereby closed, to stop the flow of water into the ground.

As will be understood, in some areas it will be undesirable to allow water to flow freely into the ground as with the previously discussed water valve. In such areas, or otherwise as desired, a pump 57 may be provided in the recirculating device, preferably mounted with the recirculating valve 58. In these installations the pump 57 would be operated by a thermal switch 59, over the line 61, in the same manner as described for the water valve 47. The pump 57 would draw water through the recirculating pipe 56, providing cooling water circulation through the jacket coil 54.

In FIG. 3 of the drawing, another form of the invention is shown in which the transformer 10″ is provided with a single-walled jacket 14′; the jacket 14′ being completely closed on all sides. The interior of jacket 14′ is filled with water over inlet pipe 42, and pipe 45. Water flows from jacket 14′ over outlet pipe 46 and pipe 48 to the residence being serviced by the transformer 10″. In the same manner as described with reference to FIG. 1, the main leads 30 are brought through an opening 28′ in the jacket 14′ directly to the transformer 10″ and the secondary leads 36 are brought out of the jacket 14′ through an opening 32′. Of course, as will be understood, inasmuch as the area 24′ within the jacket 14′ is completely filled with water it will be necessary to seal the leads both into the transformer 10″ and out from the transformer 10″ to prevent water entering or contacting the leads and disrupting the service. Of course, this may be provided in any of a number of ways which are well understood by those skilled in the art.

As described with reference to FIGS. 1 and 2, a recirculating means may be provided for providing flow of water into the jacket 14′ even though water is not flowing through the pipes 42 and 48. This recirculating means may take the form of the pipe 50 having the recirculating valve 52 which allows water to flow from pipe 46 through pipe 50 and valve 52 into pipe 45 and the jacketed area 24′. In this manner, as previously described, a continuous flow of water about the transformer 10″ may be provided in order to cool the transformer.

In the embodiment shown in FIG. 3, a vault in the form of the open tank 62 may be provided having a grate 64 covering the top of the vault 62. The vault 62 is sunk into the ground 12 with its top grate 64 directly at ground level. The vault device may be utilized if desired in order to provide ready access to the transformer 10″ for repairs or alterations, should they ever become necessary. However, it should be understood that in general, it is desirable that the transformer be directly buried in the ground and covered over by the ground such that access to the transformer is not readily possible, inasmuch as normally, in this type of installation, a single transformer will be utilized for a single residence. The transformer will be such that there will be very little need for repair and consequently no need to make the buried transformer readily accessible. In fact, in this type of installation it is desirable that the transformer not be accessible inasmuch as if the transformer is accessible for repairs it would also be accessible to those in the area, such as children who might either damage the transformer or possibly even injure themselves by having access to the transformer.

From the above description of the various embodiments of this invention it will be readily apparent to those skilled in the art that there has been described a means of water cooling a buried transformer which is relatively inexpensive and which is readily available wherever the transformer may be desired to be utilized. It will be understood that the various means described with reference to FIG. 2, such as the wicking sleeves 60, the water valve 47 and the pump 57, could also be used in conjunction with the embodiments of FIGS. 1 and 3. Of course, it will be obvious to those skilled in the art that various changes may be made in the construction and operation of the water cooling means without departing from the basic invention which is set forth in this specification. Thus, it is to be understood, that while various preferred embodiments have been shown, that various changes may be made within the scope of the claims appended hereto.

What is claimed as new and which it is desired to secure by Letters Patent of the United States is:

1. A water-cooled, buried transformer comprising, an encapsulated transformer, jacket means surrounding said transformer, said jacket means and said transformer buried underground first connecting means connecting said jacket means to a first underground water pipe, second connecting means connecting said jacket means to a second underground water pipe, said first water pipe being a water main for providing flow of water to a residence, said second water pipe being a water pipe connected to a residence, whereby upon use of water in the residence water is caused to flow through said jacket means to provide water cooling of said transformer, and wicking sleeves on at least one of said water pipes, perforations in said water pipe under said wicking sleeves, said wicking sleeves absorbing water flowing through said perforations and leaking said absorbed water about said buried transformer to provide further cooling of said transformer.

2. A water cooled, buried transformer comprising, a transformer, jacket means surrounding said transformer, said jacket means and said transformer buried underground first connecting means connecting said jacket means to a first underground water pipe for providing water flow into said jacket means to fill said jacket means with water, second connecting means connecting said jacket means to a second underground water pipe for providing water flow out of said jacket means, recirculating means connected in parallel with said jacket means, said recirculating means comprising a pipe means connected to said first and to said second connecting means and a one-way valve means connected in said recirculating pipe, pump means connected in said recirculating pipe, thermal switch means in said transformer actuated when said transformer reaches a predetermined temperature, means connecting said thermal switch means to said pump means for operating said pump means when said thermal switch means is actuated, said pump operating to pump water through said recirculating pipe, whereby water is caused to flow through said recirculating pipe into and out of said jacket means.

3. A water cooled, buried transformer comprising, a transformer, jacket means surrounding said transformer, said jacket means and said transformer buried underground first connecting means connecting said jacket means to a first underground water pipe for providing water flow into said jacket means, second connecting means connecting said jacket to a second underground water pipe for providing water flow out of said jacket means, recirculating means connected in parallel with said jacket means, said recirculating means comprising a pipe means connected to said first and to said second connecting means and a one-way valve means connected into said recirculating pipe, whereby water is caused to flow through said recirculating pipe into and out of said jacket means, and wicking sleeves on at least one of said pipes, perforations in said pipe under said wicking sleeves, said wicking sleeves absorbing water flowing through said perforations and leaking said absorbed water about said buried transformer to provide further cooling of said transformer.

4. A water-cooled, buried transformer comprising, a transformer, jacket means surrounding said transformer, said jacket means and said transformer buried underground first connecting means connecting said jacket means to a first underground water pipe for providing water flow into said jacket means to fill said jacket means with water, second connecting means connecting said jacket to a second underground water pipe for providing water flow out of said jacket means, recirculating means connected in parallel with said jacket means, said recirculating means comprising a pipe means connected to said first and to said second connecting means and a one-way valve means connected into said recirculating pipe, pump means connected in said recirculating pipe, first thermal switch means in said transformer actuated when said transformer reaches a predetermined temperature, means connecting said first thermal switch means to said pump means for operating said pump means when said first thermal switch means is actuated, said pump means operating to pump water through said recirculating pipe, whereby water is caused to flow through said recirculating pipe into and out of said jacket means, and valve means connected in said second water pipe beyond said recirculating means providing an outlet from said second water pipe, second thermal switch means in said transformer actuated when said transformer reaches a predetermined temperature, means connecting said second thermal switch means to said valve means for opening said valve means when said second thermal switch means is actuated to allow water to flow out of said outlet, thereby causing water to flow through said jacket means.

References Cited by the Examiner

UNITED STATES PATENTS

| | | | |
|---|---|---|---|
| 508,654 | 11/93 | Thomson | 174—37 |
| 1,483,442 | 2/24 | Hobart | 165—106 X |
| 2,541,904 | 2/51 | Alexander et al. | 165—42 X |
| 2,766,597 | 10/56 | Gieck | 62—315 X |
| 2,948,277 | 8/60 | Dennis | 126—362 |
| 2,964,659 | 12/60 | Steele et al. | 164—47 X |

ROBERT A. O'LEARY, *Primary Examiner.*

CHARLES SUKALO, *Examiner.*